US009424427B1

(12) United States Patent
Chiriac et al.

(10) Patent No.: US 9,424,427 B1
(45) Date of Patent: Aug. 23, 2016

(54) ANTI-ROOTKIT SYSTEMS AND METHODS

(71) Applicant: Bitdefender IPR Management Ltd., Nicosia (CY)

(72) Inventors: Mihai Chiriac, Bellevue, WA (US); Teodor Stoenescu, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 13/846,747

(22) Filed: Mar. 18, 2013

Related U.S. Application Data

(60) Provisional application No. 61/612,176, filed on Mar. 16, 2012.

(51) Int. Cl.
*G06F 21/56* (2013.01)

(52) U.S. Cl.
CPC .................................. *G06F 21/566* (2013.01)

(58) Field of Classification Search
CPC .......... G06F 9/44; G06F 21/00; G06F 11/00; G06F 21/566; H04L 63/14; H04L 63/101
See application file for complete search history.

(56) References Cited

U.S. PATENT DOCUMENTS

| 7,607,173 B1 | 10/2009 | Szor et al. |
| 7,636,856 B2 | 12/2009 | Gheorghescu et al. |
| 7,845,009 B2 | 11/2010 | Grobman |
| 7,860,850 B2 | 12/2010 | Park |
| 7,886,148 B2 * | 2/2011 | Kiriansky et al. ............. 713/166 |
| 7,996,836 B1 * | 8/2011 | McCorkendale et al. ........ 718/1 |
| 8,281,393 B2 | 10/2012 | Sallam et al. |
| 8,370,941 B1 | 2/2013 | Pham et al. |
| 2007/0112824 A1 * | 5/2007 | Lock et al. ..................... 707/102 |

OTHER PUBLICATIONS

Chriac, "Rootkit Detection via Kernel Code Tunneling," Black Hat Europe 2011 Briefings, p. 1-8, Barcelona Spain; Mar. 17, 2011.
Kassner, "The top 10 Spam Botnets: New and Improved", TechRepublic Blogs, p. 1-4, TechRepublic, Inc., Louisville, KY; Feb. 25, 2010.
Russinovich et al., "Microsoft Windows Internals, 4thEdition: Windows 2000, Windows XP, and Windows Server 2003," p. 615-618, Microsoft Press, Redmond, WA; 2005.

(Continued)

*Primary Examiner* — Chau Le
*Assistant Examiner* — Muhammad Chaudhry
(74) *Attorney, Agent, or Firm* — Law Office of Andrei D Popovici, PC

(57) ABSTRACT

According to one aspect, a dynamic binary instrumentation (DBI) framework is used to identify rootkits and disable their malicious functionality. A user-mode or kernel-mode anti-rootkit (ARK) engine monitors the execution of a program running on a host machine in user more or kernel mode. Upon encountering calls to certain functions that may be used by rootkits to subvert system functionality (e.g. system calls used to manage the system registry, storage/disk, processes/ threads, and/or network communications), the anti-rootkit engine executes translated versions of the functions in an isolated environment and continues execution of the program under analysis using the results of the translated code execution. The translated code execution replaces the execution of original code which may or may not have been subverted by a rootkit. Isolating the stack and registers of the isolated environment impedes detection of the monitoring process by rootkits.

20 Claims, 11 Drawing Sheets

(56) References Cited

OTHER PUBLICATIONS

Sparks et al, "Shadow Walker: Raising the Bar for Rootkit Detection," Black Hat USA 2005, p. 1-30, Las Vegas, NV; Jul. 23, 2005.
Kiriansky et al., "Secure Execution Via Program Shepherding," Security '02 Proceedings of the 11th USENIX Security Symposium, p. 191-206, USENIX Association, Berkeley, CA; Aug. 2002.
Rutkowski, "Execution Path Analysis: Finding Kernel Rootkits," Phrack Magazine, 59: p. 1-23, Phrack, Inc.; Jul. 28, 2002.
Black Hat, "Black Hat Europe 2011: Briefings," Black Hat Technical Security Conference: Europe 2011, http://web.archive.org/web/20110307073742/http://www.blackhat.com/html/bh-eu-11/bh-eu-11-briefings.html; archive.org indicates the web page was available on Mar. 7, 2011.
Chiriac, "Rootkit detection via Kernel Code Tunneling: Presentation Slides," Black Hat Europe 2011 Briefings, p. 1-59, Barcelona Spain; slides were presented on Mar. 17, 2011.

* cited by examiner

100 →
```
.4017F7 43                  inc ebx
.4017F8 83 7D CC 00         cmp byte ptr [ebp-34], 00
.4017FC 89 5D B8            mov dword ptr [ebp-48], ebx
.4017FF 0F 8C E0 07 00 00   jl 401FE5
.401805
```
FIG. 5-A 102 →
```
.3370000 43                 inc ebx
.3370001 83 7D CC 00        cmp byte ptr [ebp-34], 00
.3370005 89 5D B8           mov dword ptr [ebp-48], ebx
.3370008 0F 8C ?? ?? ?? ??  jl __branch_taken
__fall_through:
        JUMP_TO_VM (401805)
__branch_taken:
        JUMP_TO_VM (401FE5)
```
FIG. 5-B 104 →
```
.3370000 43                 inc ebx
.3370001 83 7D CC 00        cmp byte ptr [ebp-34], 00
.3370005 89 5D B8           mov dword ptr [ebp-48], ebx
.3370008 0F 8C ?? ?? ?? ??  jl __branch_taken
__fall_through:
        xchg esp, dword ptr [__shadow_stack]
        pushf
        pushd
        COMPUTE_JUMP (401805)
        popad
        popfd
        xchg esp, dword ptr [__shadow_stack]
        jmp dword ptr [__shadow_eip]
__branch_taken:
[......]
```
FIG. 5-C

FIG. 6-A

```
.401000 8B 44 24 04      mov eax, dword ptr [esp+4]
.401004 8B 4C 24 08      mov ecx, dword ptr [esp+8]
.401008 3B C1            cmp eax, ecx
.40100A 74 0C            jz 401018 ; __finished
.40100C
```
110

FIG. 6-B

```
.3370000 8B 44 24 04     mov eax, dword ptr [esp+4]
.3370004 8B 4C 24 08     mov ecx, dword ptr [esp+8]
.3370008 3B C1           cmp eax, ecx
.337000A 74 ??           jz __branch_taken
__fall_through:
            JUMP_TO_VM (40100C)
__branch_taken:
            JUMP_TO_VM (401018)
```
112

FIG. 6-C

```
.3370000 8B 44 24 04     mov eax, dword ptr [esp+4]
.3370004 8B 4C 24 08     mov ecx, dword ptr [esp+8]
.3370008 3B C1           cmp eax, ecx
.337000A 74 ??           jz __branch_taken
__fall_through:
    xchg esp, dword ptr [__shadow_stack]
    pushf
    pushad
    COMPUTE_JUMP (40100C)
    popad
    popfd
    xchg esp, dword ptr [__shadow_stack]
    jmp dword ptr [__shadow_eip]
__branch_taken:
    […]
```
114

FIG. 7-A

```
if (ExceptionCode = Write to RO Memory) {
// SMC?
DeleteBlocksFromPage();
RemoveProtection();
Return HANDLED;
}
```
116

```
if (ExceptionAddress in Code Cache) {
ExceptionAddress := FindRealAddress()
return CONTINUE;
}
if (Eip in Code Cache) {
Eip := FindRealAddress()
return CONTINUE;
```

FIG. 7-B

```
.3370000 43              inc ebx
.3370001 83 7D CC 00     cmp byte ptr [ebp-34], 00
.3370005 89 5D B8        mov dword ptr [ebp-48], ebx
.3370008 0F 8C ?? ?? ?? ??  jl __branch_taken
__fall_through:
        jmp dword ptr [_BB.cache_fall_through]
__branch_taken:
        jmp dword ptr [_BB.cache_branch_taken]
```

FIG. 8-A

```
.405B17 FF 24 95 20 5B 40 00 jmp dword ptr [405B20+edx*4]
```

FIG. 8-B

```
SPILL_EAX
SPILL_ECX
mov eax, dword ptr [405B20+edx*4]
lea ecx, dword ptr [eax - _real_address_1]
jecxz _1
[...]
// no match, so JUMP_TO_VM (eax)
_1:
RESTORE_EAX
RESTORE_ECX
jmp _translated_address_1
[...]
```

FIG. 8-C

| | | |
|---|---|---|
| 82A4CEE8 \| ntkrnlpa.exe | ZwReadFile | |
| 82C2F105 \| ntkrnlpa.exe | ObReferenceObjectByHandle | |
| 82ABE05A \| ntkrnlpa.exe | IoGetRelatedDeviceObject | |
| 82A9CD9A \| ntkrnlpa.exe | IoGetAttachedDevice | |
| 82AC1ABB \| ntkrnlpa.exe | IoAllocateIrp | |
| 82A47458 \| ntkrnlpa.exe | IofCallDriver | |
| 8AA06306 \| fltmgr.sys | (8AA00000)+00006306 | |
| 8ABE06DA \| fileinfo.sys | (8ABD9000)+000076DA | |
| | | |
| 8AD2B222 \| partmgr.sys | (8AD2A000)+00001222 | |
| 8AFAB39F \| CLASSPNP.SYS | (8AFA7000)+0000439F | |
| 8B1E75C2 \| disk.sys | (8B1E6000)+000015C2 | |
| 8AFAB4A1 \| CLASSPNP.SYS | (8AFA7000)+000044A1 | |
| 8ACA54AA \| ACPI.sys | (8AC9C000)+000094AA | |
| 8ABBC44E \| ataport.SYS | (8ABB6000)+0000644E | |
| 8ADAA006 \| intelide.sys | (8ADA9000)+00001006 | |
| 8ABC4B0A \| ataport.SYS | (8ABB6000)+0000EB0A | |
| 8ADB115C \| PCIIDEX.SYS | (8ADB0000)+0000115C | |
| 82E1F874 \| halmacpi.dll | (82E1B000)+00004874 | |
| 8ADB1056 \| PCIIDEX.SYS | (8ADB0000)+00001056 | |
| | | |
| 8ABC008C \| ataport.SYS | (8ABB6000)+0000A08C | |
| 8ADED438 \| atapi.sys | (8ADEC000)+00001438 | |
| 8ACA53B8 \| ACPI.sys | (8AC9C000)+000093B8 | |
| 8AFAB5A4 \| CLASSPNP.SYS | (8AFA7000)+000045A4 | 150 |
| 8AD2B230 \| partmgr.sys | (8AD2A000)+00001230 | |
| 8AA0620C \| fltmgr.sys | (8AA00000)+0000620C | |
| 82A4E487 \| ntkrnlpa.exe | (82A0B000)+00043487 | |
| 82A4CEF9 \| ntkrnlpa.exe | (82A0B000)+00041EF9 | |
| *B1C36492 \| KLUP.sys* | *(B1C35000)+00001492* | |

FIG. 10

```
86BDE574 | CLASSPNP.SYS  (86BDA000)+00004574
831B3EB6 | lsi_scsi.sys   (8319F000)+00014EB6(T)
855A2F61 | ???            (00000000)+855A2F61
855A2FD9 | ???            (00000000)+855A2FD9
855A2FED | ???            (00000000)+855A2FED
855A30D8 | ???            (00000000)+855A30D8
855A310A | ???            (00000000)+855A310A
855A3150 | ???            (00000000)+855A3150
[…]
831C14B1 | storport.sys   (831B9000)+000084B1
```

160

```
void ReadMBR0( )
  {
    li.LowPart = 0;
    li.HighPart = 0;
    dwStatus =ZwReadFile (hDisk, NULL, NULL,
  NULL, &ioBlock, pBuf, 512, &li, NULL);
  }
```
168

```
int Hook (QWORD Sector, BYTE *pData)
  {
    if (Sector == Rootkit_Sector)
    {
      memset (pData, 0, 512);
      return 1;
    }
    return OriginalFunction (Sector, pData);
```
170

```
int Hook (QWORD Sector, BYTE *pData)
  {
    if (Sector == Rootkit_Sector)
    {
    NOP
    }
    return OriginalFunction (Sector, pData);
```
172

FIG. 12

```
int gcd (int i, int j)
{
        while (i != j)
        {
                if (i < j) {
                        j -= i;
                }
                else {
                        i -= j;
                }
        }
        return i;
}
```
⟵ 180

```
.text:00401000 gcd         proc near       ;CODE XREF: _main+3F↓p
.text:00401000
.text:00401000 i           =dword ptr 4
.text:00401000 j           =dword ptr 8
.text:00401000
.text:00401000             mov eax, [esp+i]
.text:00401004             mov ecx, [esp+j]
.text:00401008             cmp eax, ecx
.text:0040100A             jz   short_finished
.text:0040100C
.text:0040100C _again:                     ;CODE XREF: gcd+16↓j
.text:0040100C             jge short i_is_greater; i -= j
.text:0040100E             sub ecx, eax;    j -= i
.text:00401010             jmp short_check
.text:00401012 ;-------------------------------------------
.text:00401012 i_is_greater:               ;CODE XREF: gcd:_again↑j
.text:00401012             sub eax, ecx; i -=j
.text:00401014
.text:00401014 _check:                     ;CODE XREF: gcd+10↑j
.text:00401014             cmp eax, ecx
.text:00401016             jnz short_again
.text:00401018
.text:00401018 _finished:                  ;CODE XREF: gcd+A↑j
.text:00401018             retn
.text:00401018 gcd         endp
.text:00401018
```
182 ⟶

FIG. 13-A

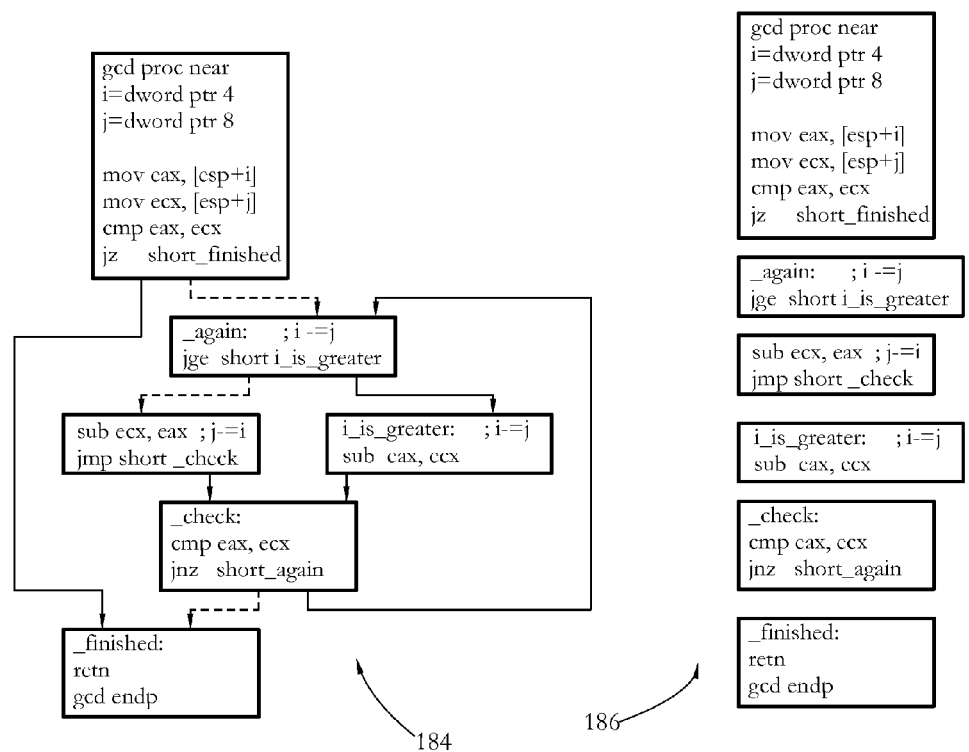
FIG. 13-B

ANTI-ROOTKIT SYSTEMS AND METHODS

BACKGROUND

The invention relates to systems and methods for protecting users from malicious software, and in particular to detecting and deactivating rootkits.

Malicious software, also known as malware, affects a great number of computer systems worldwide. In its many forms, malware presents a serious risk to millions of computer users, making them vulnerable to loss of data, identity theft, and loss of productivity, among others.

Computer programs dedicated to malware scanning employ various methods of detecting and eliminating malware from user computer systems. Such methods include behavior-based techniques and content-based techniques. Behavior-based methods may involve emulating the suspected program in an isolated virtual environment, identifying malicious behavior, and blocking the execution of the offending program. In content-based methods, the contents of a suspected object are commonly compared to a database of known malware-identifying signatures. If a known malware signature is found in the suspected object, the object is labeled as malicious.

Rootkits include stealth capabilities designed to hide the existence of associated processes or programs from normal methods of detection by subverting standard system functionality. For example, some rootkits may hijack file system functionality so that rootkit objects are not listed or otherwise disclosed in response to file system calls. Rootkits can be particularly difficult to identify and remove.

Fifteen years ago, malware writers were often young and motivated by peer approval and notice. Modern cyber criminals are more often interested in staying away from the public eye, and in remaining undetected as long as possible. In particular, targeted attacks directed at specific individuals and organizations benefit greatly from stealth. Specifically-crafted malware, distributed only to a handful of computers, may be unlikely to show up on the radar of security companies, especially given recent increases in detected malware. Rootkits are also used by spam botnets.

SUMMARY

According to one aspect, a computer system comprises at least one processor configured to form an anti-rootkit (ARK) engine. The ARK engine includes a dynamic binary instrumentation (DBI) engine, and a rootkit identification engine responsive to the DBI engine. The DBI engine includes a code generation engine configured to dynamically identify a set of control transfer instructions in a target program being executed on the computer system, and, for each identified control transfer instruction, replace the identified control transfer instruction with at least one translated instruction transferring execution control from the target program to an isolated virtual environment, for execution of a translated target of the identified control transfer instruction in the isolated virtual environment. The rootkit identification engine is configured to identify a presence of a rootkit on the computer system according to a result of executing the target of the identified control transfer instruction in the isolated virtual environment.

According to another aspect, a computer-implemented method comprises employing a computer system comprising at least one processor to: dynamically identify a set of control transfer instructions in a target program being executed on the computer system; for each identified control transfer instruction, replace the identified control transfer instruction with at least one translated instruction transferring execution control from the target program to an isolated virtual environment, for execution of a translated target of the identified control transfer instruction in the isolated virtual environment; and identify a presence of a rootkit on the computer system according to a result of executing the target of the identified control transfer instruction in the isolated virtual environment.

According to another aspect, a non-transitory computer-readable medium encodes instructions which, when executed by a computer system comprising at least one processor, cause the computer system to: dynamically identify a set of control transfer instructions in a target program being executed on the computer system; for each identified control transfer instruction, replace the identified control transfer instruction with at least one translated instruction transferring execution control from the target program to an isolated virtual environment, for execution of a translated target of the identified control transfer instruction in the isolated virtual environment; and identify a presence of a rootkit on the computer system according to a result of executing the target of the identified control transfer instruction in the isolated virtual environment.

BRIEF DESCRIPTION OF THE DRAWINGS

The foregoing aspects and advantages of the present invention will become better understood upon reading the following detailed description and upon reference to the drawings where:

FIGS. 5-A-B-C illustrate the translation of a basic block including a branch instruction according to some embodiments of the present invention.

FIGS. 6-A-B-C illustrate the translation of another basic block including a branch instruction according to some embodiments of the present invention.

FIG. 7-A illustrates steps taken by a self-modifying code manager upon identifying an exception caused by an attempt to write to read-only memory, according to some embodiments of the present invention.

FIG. 7-B illustrates steps taken by an asynchronous task manager in response to an exception, according to some embodiments of the present invention.

FIG. 8-A shows an exemplary translated basic block for which the block's successor(s) be can determined at translation time, according to some embodiments of the present invention.

FIG. 8-B shows an exemplary indirect control transfer instruction for which successors cannot be readily identified statically, according to some embodiments of the present invention.

FIG. 8-C shows an exemplary translated code block used to handle the instruction of FIG. 8-B according to some embodiments of the present invention.

FIG. 10 shows a part of a log session for a normal disk operation according to some embodiments of the present invention.

FIG. 12 shows exemplary Master Boot Record (MBR) read code, rootkit hook code which may be used by a rootkit to return fake (e.g. empty sector) data upon an attempt to perform a read on a rootkit sector, and corresponding disarmed code including a NOP (no operation) instead of the detected offensive instructions, according to some embodiments of the present invention.

FIGS. 13-A-B illustrate an exemplary code generation process for a set of greatest-common-divisor C code, which includes one or more branches, according to some embodiments of the present invention.

DETAILED DESCRIPTION OF PREFERRED EMBODIMENTS

Figure 1:
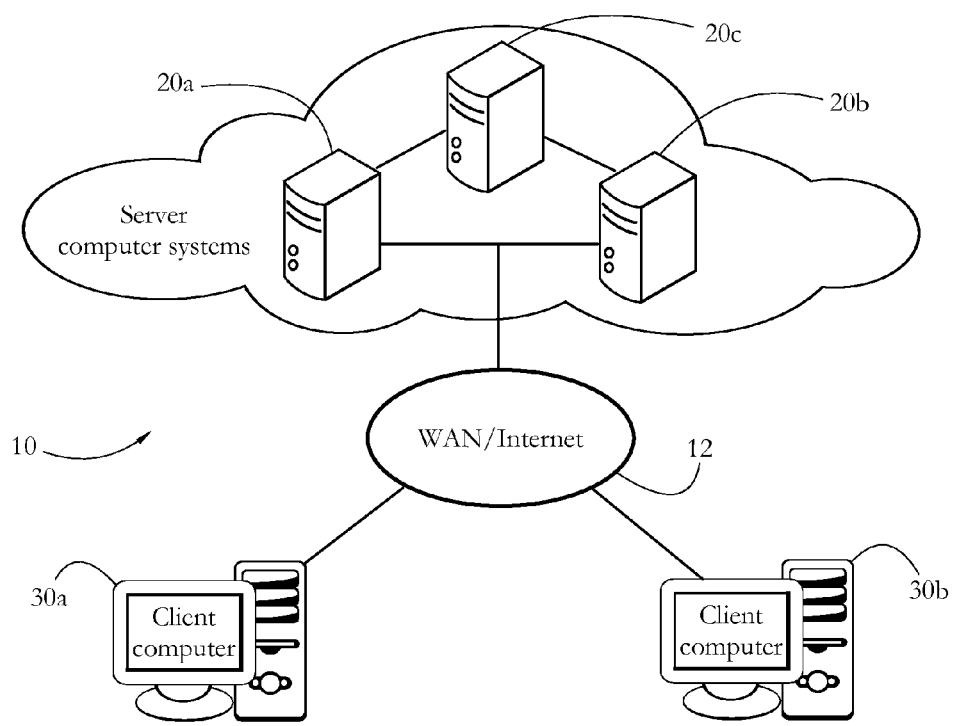
FIG. 1 shows an exemplary anti-malware system according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A basic block is a code sequence which does not include any internal control flow transfers (e.g. jump instructions). The term "virtual machine" is used below to refer to an isolated environment whose stack and registers do not pollute the stack and register states used by the program of interest; executing code on such a virtual machine does not lead to changes in stack and register states at the end of execution on the virtual machine; such a virtual machine need not emulate various capabilities of a host machine. Computer programs described in some embodiments of the present invention may be stand-alone software entities or sub-entities (e.g., subroutines, code objects) of other computer programs. Unless otherwise specified, a target object is a file or a process residing on a client computer system. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

According to one aspect, a dynamic binary instrumentation (DBI) framework is used to identify rootkits and disable their malicious functionality. A user-mode or kernel-mode anti-rootkit (ARK) engine monitors the execution of a program running on a host machine in user more or kernel mode. Upon encountering calls to certain functions that may be used by rootkits to subvert system functionality (e.g. system calls used to manage the system registry, storage/disk, processes/threads, and/or network communications), the ARK engine executes translated versions of the functions in an isolated environment, termed a "virtual machine" below for simplicity, and subsequently continues execution of the program under analysis using the results of the translated code execution. The translated code execution replaces the execution of original code, which may or may not have been subverted by a rootkit. In order to impede detection of the ARK engine by rootkits, the ARK engine runs in an isolated environment so as not to change the stack and register states used by the program of interest.

In some embodiments, control flow transfers (e.g. jump instructions), which may be used by rootkits to execute their particular code instead of standard system code, are detected and replaced during program execution with special instructions (e.g. JUMP_TO_VM(EIP)) directing a transfer of control to the ARK engine. The ARK engine maintains a shadow stack and shadow registers separate from those used by the host machine program under analysis. Maintaining a shadow stack and shadow registers may be achieved by returning the state of the system stack and registers to the state expected by the program of interest, before returning execution to the program of interest.

In some embodiments, the ARK engine comprises an instrumentation engine and a decision engine. The instrumentation engine includes a code generation engine, a basic block manager for managing a basic block cache, a self-modifying code manager for detecting and handling self-modifying code, and an asynchronous task handler for detecting and handling exceptions. The code generation engine is configured to add instrumentation code to the original code under analysis; detect potentially offensive code and replace the code or precede it by special instrumentation code; and replace branch instructions with routines responsible for returning control to the anti-rootkit engine using updated instruction pointer values. The decision engine identifies offensive code and determines whether the program of interest is a rootkit FIG. 1 shows an exemplary malware detection system 10 according to some embodiments of the present invention. System 10 comprises a set of anti-malware (AM) server systems 20a-c and a set of client computer systems 30a-b. Client computer systems 30a-b may represent end-user computers each having a processor, memory, and storage, and running an operating system such as Windows®, MacOS® or Linux. Some client computer systems 30a-b may represent mobile computing and/or telecommunication devices such as tablet PCs and mobile telephones. In some embodiments, client computer systems 30a-b may represent individual customers, or several client computer systems may belong to the same customer. In some embodiments, one of systems 30a-b may be a server computer such as a mail server. A network 12 connects client computer systems 30a-c and anti-malware server systems 20a-c. Network 12 may be a wide-area network such as the Internet. Parts of network 12, for example a part of network 12 interconnecting client computer systems 30a-b, may also include a local area network (LAN).

Figure 2:
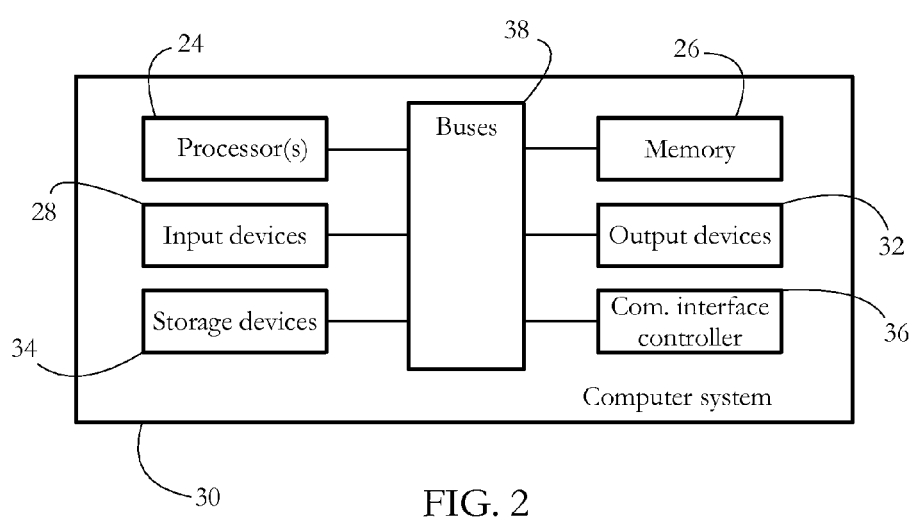
FIG. 2 illustrates an exemplary hardware configuration of a client computer system according to some embodiments of the present invention.

FIG. 2 shows an exemplary hardware configuration of a client computer system 30. In some embodiments, system 30 comprises one or more processors 24, a memory unit 26, a set of input devices 28, a set of output devices 32, a set of storage devices 34, and a communication interface controller 36, all connected by a set of buses 38. In some embodiments, processor 24 comprises a physical device (e.g. multi-core integrated circuit) configured to execute computational and/or logical operations with a set of signals and/or data. In some embodiments, such logical operations are delivered to processor 24 in the form of a sequence of processor instructions (e.g. machine code or other type of software). Memory unit 26 may comprise random-access memory (RAM) storing instructions and operands accessed and/or generated by processor 24. Input devices 28 may include computer keyboards and mice, among others, allowing a user to introduce data and/or instructions into system 30. Output devices 32 may include display devices such as monitors. In some embodiments, input devices 28 and output devices 32 may share a common piece of hardware, as in the case of touch-screen devices. Storage devices 34 include computer-readable media enabling the storage, reading, and writing of software instructions and/or data. Exemplary storage devices 34 include magnetic and optical disks and flash memory devices, as well as removable media such as CD and/or DVD disks and drives. Communication interface controller 36 enables system 30 to connect to a computer network and/or to other machines/computer systems. Typical communication interface controllers 36 include network adapters. Buses 38 collectively represent the plurality of system, peripheral, and chipset buses, and/or all other circuitry enabling the intercommunication of devices 24-36 of computer system 30. For example, buses 38 may comprise the northbridge bus connecting processor 24 to memory 26, and/or the southbridge bus connecting processor 24 to devices 28-36, among others.

Figure 3:
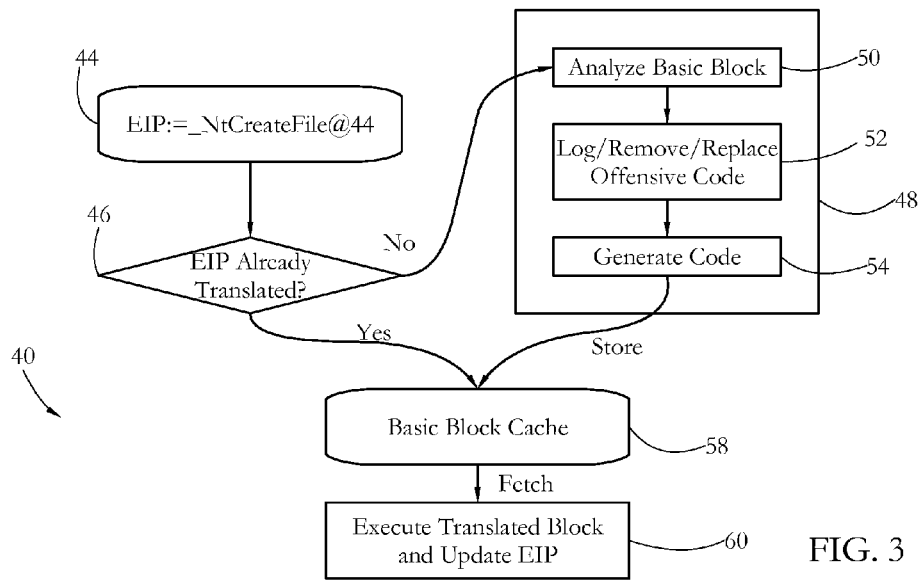
FIG. 3 shows a sequence of steps performed by an anti-rootkit (ARK) engine according to some embodiments of the present invention.

FIG. 3 shows a sequence of steps 40 performed by an anti-rootkit (ARK) engine according to some embodiments of the present invention. In a step 44, a call to a rootkit-target function is detected in the code under analysis. An exemplary CreateFile function is shown in FIG. 3. Detecting the rootkit-target function may include detecting a predetermined instruction pointer value corresponding to the function. The instruction pointer value specifies the address of the instruction to be executed presently. For simplicity, the discussion below focuses mainly on a 32-bit instruction pointer register EIP. Some embodiments may employ a 16-bit, 64-bit, or other-sized instruction pointer register. The instruction of interest is an instruction which may be targeted by rootkits, such as an instruction used for management of the system registry, storage/disk, processes/threads, and network communications. In an exemplary Windows/x86 system, examples of suitable registry management functions include EnumerateKey, EnumerateValueKey, and CreateKey, among others. Examples of suitable storage management functions include CreateFile, ReadFile, WriteFile, and QueryDirectoryFile, among others. Examples of process/thread management functions include QuerySystemInformation, QueryInformationProcess, and QueryInformationThread, among others. Networking monitoring may include monitoring the Windows Sockets kernel, for example using the DeviceIOControlFile function, among others.

In a step 46, the ARK engine determines whether the identified function has already been translated. If yes, the translated function is retrieved from a basic block cache 58. In a step 60, the translated function is executed in an isolated environment, and the instruction pointer is updated according to the result of executing the translated function. If the identified function has not been translated yet, execution proceeds to a sequence of code translation steps 48. In a step 50, a basic block defined between the current instruction pointer value and the following control flow transfer (e.g. jump instruction) is analyzed as described below. In a step 52, offensive/suspicious code is logged and removed or replaced as described below. Offensive code may be code that exhibits certain behavior, such as instructions which access segment registers, control register, or debug registers. An instruction such as FSTENV, which stores the FPU (floating-point unit) operating environment (control word, status word, tag word, instruction pointer, data pointer, and last opcode) into memory, may be deemed offensive in some embodiments. In a step 54, translated code corresponding to the identified basic block is generated. The translated code is then stored in basic block cache 58.

Figure 4:
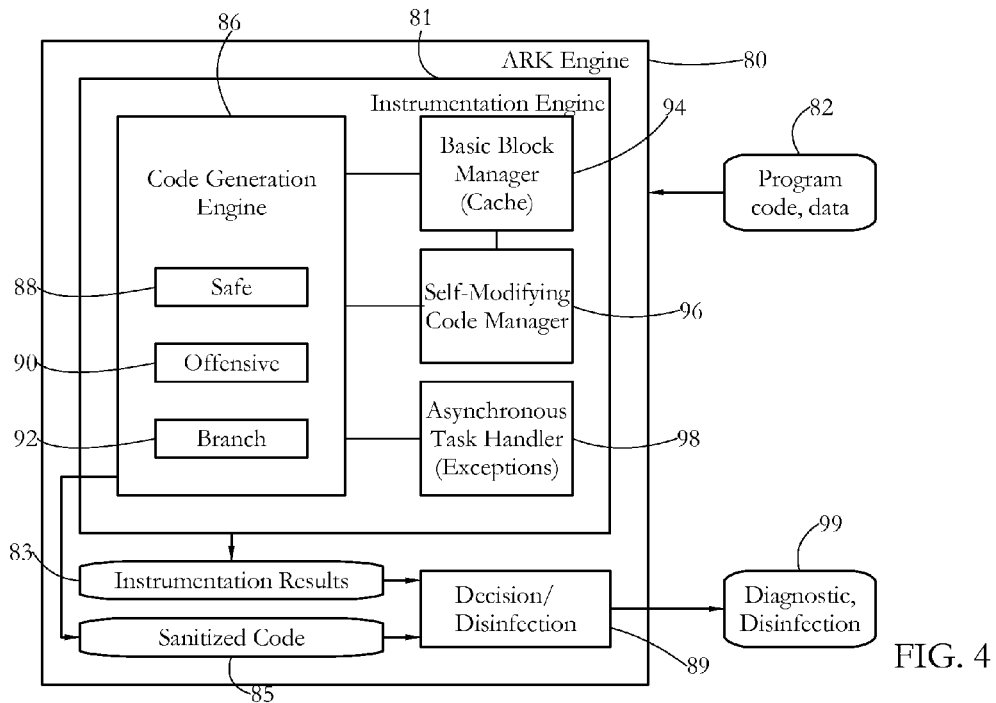
FIG. 4 shows a diagram of an exemplary anti-rootkit (ARK) engine according to some embodiments of the present invention.

FIG. 4 shows the structure of an anti-rootkit (ARK) engine 80 running on a host computer system, which may be a client and/or server computer system, according to some embodiments of the present invention. ARK engine 80 may be an engine running in user-space and/or kernel space, as described below. In some embodiments, ARK engine 80 may be a stand-alone application, or may be an anti-rootkit engine of a security suite having antivirus, firewall, anti-spam, and other modules. ARK engine 80 receives host program code and associated data for basic code blocks corresponding to rootkit-target functions, and outputs updated instruction pointers allowing the execution of the host program to continue, as well as the results of executing translated code corresponding to the rootkit-target functions.

ARK engine 80 includes an instrumentation engine 81 configured to generate a set of instrumentation results 83 and sanitized code 85 as described below, and a decision/disinfection engine 89 configured to determine to identify the presence of rootkits according to a number of heuristics and/or to generate diagnostic/disinfection data 99 (e.g. a rootkit diagnostic indicator and disinfection code) as described below. Instrumentation engine 81 includes a code generation engine 86, which adds instrumentation code to the received original code, copies some instructions, modifies others and adds instructions as described below. In particular, code generation engine 86 includes a safe-code duplication module 88 which generally duplicates safe instructions 1:1. In some embodiments, most instructions are duplicated without modifications. Code generation engine 86 further includes an offensive instruction handling module 90, which replaces offensive instructions or precedes them by special instrumentation code. Code generation engine 86 also include a branch instruction handling module, which replaces branch instructions with specific routines responsible for returning control to ARK engine 80.

FIGS. 5-A-B-C illustrate the translation of a basic block including a branch instruction according to some embodiments of the present invention. FIG. 5-A shows the original code, while FIGS. 5-B-C show translated code. An original basic block 100 starts at linear address 4017F7 and ends with the jl (jump if less) branch instruction at 4017FF; block 100 itself ends at 401805. If the branch condition is met, the processor jumps to the branch taken address, which is 401FE5; else, it falls through to address 401805. As shown in FIG. 5-B, all instructions except the branch instruction are copied 1:1 in a translated block 102. In the illustrated example, it was possible to compute both the branch taken and fall through addresses at translation time, so the branch instruction was simply replaced with JUMP_TO_VM functions specifying the updated instruction pointer, which return control to ARK engine 80. The JUMP_TO_VM macro does not pollute the host machine stack in any way, nor modify any of the CPU registers or a memory area outside of its own data structures. To facilitate such isolation, ARK engine 80 maintains a per-thread shadow stack data structure, which is used to spill registers that can be modified by code generation engine 86. FIG. 5-C shows exemplary translated code block 104 generated by translating original block 100, with stack- and register-isolation instructions added to prevent stack pollution or register alteration. In some embodiments, a JUMP_TO_VM function may include stack-isolation and register-isolation instructions as shown in FIG. 5-C, in addition to a jump execution instruction (exemplarily illustrated as COMPUTE_JUMP in FIG. 5-C).

FIGS. 6-A-B-C illustrate the translation of an original basic block 110 into a translated basic block 112 (FIG. 6-B) and translated basic block 114 employing shadow data structures (FIG. 6-C), for a basic block ending in a jz (jump on zero) assembly instruction.

As shown in FIG. 4, instrumentation engine 81 further includes a basic block manager (cache) 94, which maintains a list of already-translated basic blocks for quick retrieval. Basic block cache 94 serves to increase execution speed, as translation time is reduced particularly when the code of interest includes loops.

As shown in FIG. 4, instrumentation engine 81 further includes a self-modifying code manager 96, which detects and handles self-modifying code. In the absence of self-modifying code manager 96, if a program were to modify a basic block that has already been executed and is thus present in basic block cache 94, ARK engine 80 may cause execution of the old, unmodified code, rather than the new, modified one. In user-mode, self-modifying code manager 96 determines whether every basic block resides in write-protected memory and analyzes any possible access violation exceptions. If a basic block does not reside in write-protected memory, self-modifying code manager 96 changes the memory attributes for that block so that attempts to write to that area generate an exception which can be detected. If a write operation would modify one of the translated basic blocks stored in basic block cache 94, the basic block is deleted from basic block cache 94 and the write protection for that block is temporarily removed to allow the write operation. If an instruction modifies its own basic block, the basic block is re-translated and execution is resumed accordingly. FIG. 7-A shows exemplary code 116 illustrating steps taken in response to detecting an exception caused by an attempt to write to read-only (write-protected) memory, which may be indicative of the presence of self-modifying code.

As shown in FIG. 4, instrumentation engine 81 also includes an asynchronous task manager 98, which detects and handles exceptions. A known anti-debugging trick, which may be used by some rootkits, is to transfer control by generating an exception. Ideally, instrumentation engine 81 maintains control of program execution. In some embodiments, asynchronous task manager 98 hooks one or more exception handling functions such as the KiUserExceptionDispatcher function, and inspects its/their parameters. One such parameter may be an EXCEPTION_RECORD structure, which contains information such as an exception code and exception address. If an exception occurs within the translated code, the ExceptionAddress is updated with the correct value to maintain a mapping between the original code and translated code. Another such parameter is a CONTEXT structure, which contains the CPU registers from when the exception occurred. As with the ExceptionAddress handling, the EIP contents are updated with the correct value if an exception occurs inside the translated code. FIG. 7-B shows exemplary code 118 illustrating the update of the exception address and EIP contents. In some embodiments, asynchronous task manager 98 detects and handles asynchronous procedure calls (APC) and user-mode callbacks sent by OS drivers such as the Win32k.sys Windows driver. Such events may be handled by asynchronous task manager 98 by hooking KiUserApcDispatcher and KeUserModeCallback, respectively.

In some embodiments, a number of steps were observed to speed execution during testing. FIG. 8-A shows an exemplary translated basic block 120 for which the block's successor(s) can be determined at translation time. Such a basic block may be directly linked to its successor(s). Initially, the cache_fall_through and cache_branch_taken variables point to a subroutine that finds the basic block's successor(s). All subsequent executions of the basic blocks then use the cached addresses. FIG. 8-B shows an exemplary indirect control transfer instruction 122, for which successors cannot be readily identified statically. As illustrated, the jump target depends on the value held in the register edx. FIG. 8-C shows an exemplary translated code block 124 used to handle instruction 122. Code block 124 first attempts to find a match with the last 4 successors, and if no match is found, executes a JUMP_TO_VM to the address held in register eax, which is the address shown in FIG. 8-B. The exemplary code shown in FIG. 8-C does not include an expensive pushfd/popfd pair, since the lea/jecxz instruction pair does not alter CPU flags.

In some embodiments, instrumentation code is not added to every basic block of the program under analysis. In order to detect rootkits, ARK engine 80 maintains a list of executed basic blocks, a list of potentially offensive instructions discovered during translation, and other flags, such as flags identifying the presence of do-nothing (garbage) instructions. In some embodiments, most such instructions are performed only once, at translation time. In testing, code execution using an ARK engine as described herein was observed to be slower by about 25% than original code execution.

In some embodiments, an ARK engine 80 operating in kernel-mode is capable of analyzing code running at multiplex IRQL levels, including Passive, APC and DPC levels. The Interrupt Request Level (IRQL) parameter denotes the priority ranking of an interrupt; an interrupt with a higher IRQL level can interrupt a task with a lower IRQL level. In some embodiments, a Passive Level corresponds to an IRQL value of 0, an APC level corresponds to an IRQL value of 1, and a DPC level corresponds to an IRQL value of 2.

In some embodiments, a kernel-mode ARK engine 80 includes or employs a custom memory manager. A custom memory manager may be used to allocate during initialization a chunk of memory from the non-paged pool, partition the allocated memory, and manage subsequent memory access operations by the ARK engine 80. Non-paged pool resources can be accessed at any IRQL level. Such a memory manager stores basic block structures, the basic block cache, and instrumentation information.

In some embodiments, in order to instrument more than one thread, a separate instance of a kernel-mode ARK engine 80 is instantiated for each thread, and each ARK engine 80 does not include concurrent access control. Using a single kernel-mode ARK engine 80 to analyze multiple threads may be problematic if a thread has to wait before being granted access to a shared resource such as the basic block cache. In some embodiments, a user-mode ARK engine 80 may be used to analyze multiple threads. Such a shared ARK engine 80 may include a shared basic block cache and may be more convenient to implement than multiple per-thread ARK engine instances. Switching between kernel threads may generally occur through a variety of instructions/entrypoints, and such switching may be difficult to monitor. By contrast, in some embodiments, switches between kernel threads and a user thread of ARK engine 80 may occur primarily through one or a few entrypoints, such as a KiUserExceptionDispatcher or KiUserAPCDispatcher function monitored by ARK engine 80.

In some embodiments, detecting and modifying exceptions may be performed by hooking vectors from the Interrupt Descriptor Table (IDT). The IDT is a data structure used by processors to determine the correct response to interrupts and exceptions. Some rootkits may include hardware read breakpoints in their own code in order to detect attempts to read the rootkit code. Such rootkits may use a debug register to generate an interrupt when a read attempt for a particular address is detected, allowing the rootkit to temporarily replace the contents at that address with original (non-malicious) content; in effect, a given address behaves as if storing different contents for reading (clean) and code execution (rootkit code). In some embodiments, ARK engine 80 modifies the page table before reading data, and reads data using the modified page table, which uses a different virtual address than the program of interest to read a given physical address. If the rootkit detection relies on flagging a given virtual address, such a read attempt by ARK engine 80 would not trigger an exception, allowing the true data at the underlying physical address to be read. Such a memory virtualization layer may come at the cost of increased execution complexity.

In some embodiments, self-modifying kernel-mode code may be particularly difficult to detect, since a rootkit with kernel-mode privileges can perform an additional number of operations, such as directly modifying page attributes, to avoid detection. In some embodiments, a direct-linking approach as illustrated in FIG. 8-A is not used for kernel-mode code; every transfer goes through ARK engine 80, which may verify, for example via a set of checksums, that no modifications to the code have occurred. In some embodiments, if a basic code block modifies itself, for example if the block is large enough and the modification occurs beyond the pre-fetch queue, ARK engine 80 may end up executing the old, unmodified code. To prevent such behavior, in some embodiments the size of each basic block is limited to a lower limit than would be attained by allowing execution until the next control flow transfer. Basic blocks larger than a pre-set limit are broken up into smaller blocks, which reduce the chance that self-executing code may execute prior to detection. Choosing a low value (e.g. 1 instruction) for the pre-set limit would lead to a considerable decrease in speed, and may not be necessary in practice to prevent the execution of self-modifying code, which commonly involves longer code sequences. In some embodiments, the pre-set limit may be chosen to be about equal to an average number of instructions per basic block for a given architecture, or another limit that balances system speed with ability to detect self-modifying code. In another approach to preventing the execution of self-modifying code before the behavior is detected, a memory virtualization layer as described above is applied to all memory accesses. Analysis then proceeds using virtual addresses. Such an approach may involve adding a memory translation operation for each instruction to be analyzed, which involves reduced efficiency compared to an approach in which most instructions are simply copied 1:1.

The operation of ARK engine 80 may be better understood by considering a number of steps performed to analyze a storage access operation. The device drivers involved in managing a storage device (e.g. disk drive) are collectively known as the storage stack. In some embodiments, if an application attempts an operation (read/write) on a storage device, the request is received by an I/O Manager, which sends the request to the File System, which translates file addresses to volume addresses and forwards the request to a Volume Manager. In some embodiments, a Windows operating system supports basic volumes on a single partition, and dynamic volumes, which can span multiple partitions. The Volume Manager may forward the I/O request to a Partition Manager.

Figure 9:
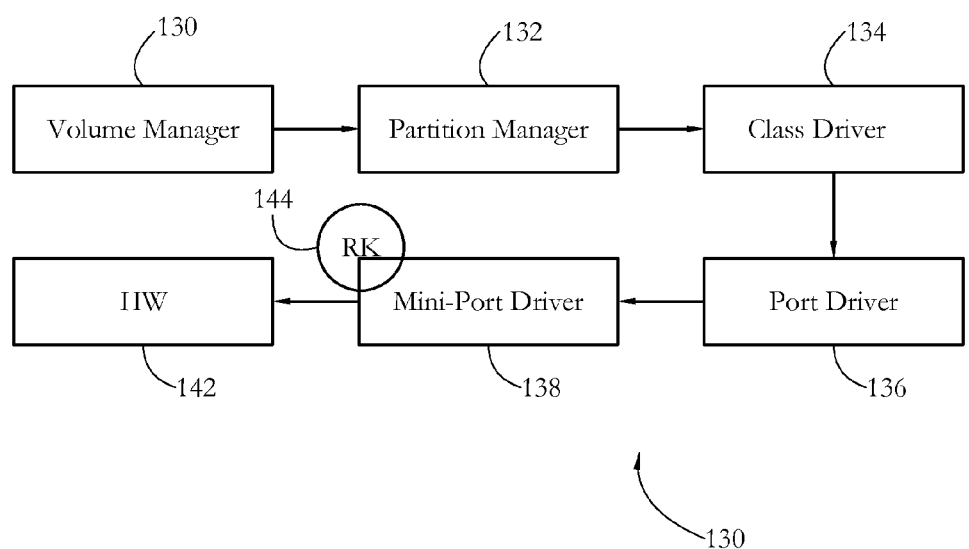
FIG. 9 shows part of a storage stack between a volume manager and storage hardware 142, according to some embodiments of the present invention.

FIG. 9 shows part of a storage stack 130 between a Volume Manager and storage hardware 142, according to some embodiments of the present invention. Storage stack 130 includes, in sequence, a partition manager 132 for managing partitions, a class driver 134 used to manage a particular device type (e.g. disk or tape), a port driver 136 used to manage a specific transport protocol (e.g. Storport for SCSI and RAID, Atapi for IDE-based device), and a miniport driver 138, which are vendor-supplied and manage hardware-specific operations. An exemplary rootkit 144 is shown in FIG. 9 to illustrate that a rootkit in general may insert code at any level in the storage stack, including at the miniport driver level, in order to evade detection.

FIG. 10 shows a part 150 of a log session for a normal disk operation. Such an operation may proceed from file system filter driver to file system driver, volume and partition managers, class driver, to port and miniport driver and then hardware. Ntkrnlpa.exe represents the Windows kernel, and KLUP.sys is a driver forming at least part of ARK engine 80. In some embodiments, the analyzed storage stack is deemed clear if, upon analyzing the entire execution path and logging all instructions, it is observed that there are no suspicious control transfers (e.g. control transfers to unrecognized or inappropriate basic blocks), no suspicious (e.g. self-modifying) basic blocks, no garbage or offensive instructions, and all basic blocks belong to modules legally-loaded by the operating system kernel.

Figure 11:
FIG. 11 shows a part of a log session for an abnormal disk operation indicating the presence of a rootkit, according to some embodiments of the present invention.

FIG. 11 shows a part 160 of a log session for disk operation in a system infected by an exemplary rootkit. A number of indicators may be deemed to point to the presence of a rootkit: detected execution of code out of data sections, i.e. outside of code sections; observed mismatch between the in-memory and on-disk images of a driver used for disk access (e.g. lsi_scsi.sys in FIG. 11); and execution of orphaned code, which does not belong to a legally-loaded module (illustrated by question marks in FIG. 11).

In some embodiments, disinfection may be performed by executing sanitized (disarmed) code instead of original code deemed to be offensive. FIG. 12 shows an exemplary Master Boot Record (MBR) read sequence 168, which employs a call to ZwReadFile to read 512 bytes present in a buffer pBuf. A Master Boot Record may hold information on how logical disk partitions are organized on a storage medium such as a hard drive. A rootkit may hook a function such as ZwReadFile in order to prevent the reading of compromising data. FIG. 12 shows exemplary rootkit hook code 170 which may be used by a rootkit to return fake (e.g. empty sector) data upon an attempt to perform a read on a rootkit sector, and corresponding disarmed code 172 including a NOP (no operation) instead of the detected offensive instructions.

In some embodiments, the offensive code may be patched dynamically, at runtime, though such an approach, which involves modifying code in memory, may raise a number of potential problems. For example, an exemplary rootkit, TDL3, uses a second thread to perform integrity checks on a first thread, a technique which may detect such code patching. A race condition may occur if the code being patched is being concurrently executed by a different thread, and it may be difficult to find atomic operations to disarm a hook while it is not being executed.

In some embodiments, the above-problems that may occur for live patching may be alleviated by using ARK engine 80 to maintain pairs of signatures: each pair includes a signature for malware code (e.g. rootkit hook) and a signature for disarmed (e.g. NOP-ed) malware code. During code generation performed by ARK engine 80, when encountering original malicious code, ARK engine 80 is used to translate the corresponding disarmed code rather than the original malicious code. During code generation, the process is executed in a controlled environment by ARK engine 80, which allows ensuring that there are no race conditions. When the malicious code is subsequently called by a process running on the host machine, ARK engine 80 executes the disarmed code. Thus the malware is disarmed even if the malware body is never modified. At the same time, known detection and remediation technologies such as deletion of files and registry entries and killing rootkit processes are available when the clean path is executed.

FIGS. 13-A-B illustrate an exemplary code generation process for a set of greatest-common-divisor C code 180, which includes one or more branches. Corresponding assembly code is shown at 182 in FIG. 13-A. A division of the assembly code 182 into basic blocks is shown at 184, and corresponding translated code including JUMP_TO_VM instructions is shown at 186 in FIG. 13-B. As the illustrated code shows, rather than perform a control flow transfer instruction (e.g. jump instruction), ARK engine 80 calculates an address to be jumped to, in a controlled context.

Exemplary systems and methods as described above facilitate the detection of rootkits using a kernel-mode or user-mode anti-rootkit engine. A dynamic binary instrumentation engine adds instrumentation code to every basic block in a program of interest, so that calls to functions targeted by rootkits (e.g. file system management functions such as read functions) result in execution of translated, clean versions of the functions, rather than original versions of the functions which may have been subverted by rootkits. Executing translated basic blocks in an isolated virtual environment having a shadow stack and shadow registers makes it difficult for rootkits to identify the anti-rootkit engine. Caching translated basic blocks improves system efficiency, while handling self-modifying code and system exceptions allows maintaining control with the anti-rootkit engine. De-obfuscating actions that would be otherwise hidden by rootkit functionality allows identifying malicious program features such as code trampolines outside code sections, mismatches between memory and disk images, and execution of orphaned code. Executing disarmed basic blocks rather than original blocks as described above allows disarming malicious functionality without modifying the malicious code itself, allowing the use of a full range of detection and remediation techniques.

It will be clear to one skilled in the art that the embodiments described herein may be altered in many ways without departing from the scope of the invention. Accordingly, the scope of the invention should be determined by applicants' claims and their legal equivalents.

What is claimed is:

1. A computer system comprising at least one processor and associated memory configured to form an anti-rootkit (ARK) engine, the ARK engine comprising:
   a dynamic binary instrumentation (DBI) engine comprising
      a code generation engine configured to
         dynamically identify a set of control transfer instructions in a target program being executed on the computer system; and
         in response to identifying an original instruction as a control transfer instruction, replace the original control transfer instruction with at least one translated instruction transferring execution control from the target program to an isolated virtual environment, for execution of a target of the translated control transfer instruction in the isolated virtual environment, wherein the original control transfer instruction does not transfer execution control from the target program, and wherein the original control transfer instruction is a jump instruction;
   a self-modifying code manager configured to determine whether the target of the translated control transfer instruction resides in write-protected memory, and to write-protect a memory space storing the target of the translated control transfer instruction in response to determining that the target of the translated control transfer instruction resides in memory that is not write-protected;
   an asynchronous task manager configured to hook an exception-handling function, and in response, update a set of parameters of the exception-handling function; and
   a rootkit identification engine responsive to the DBI engine and configured to identify a presence of a rootkit on the computer system according to a result of executing the target of the translated control transfer instruction in the isolated virtual environment.

2. The computer system of claim 1, wherein the set of control transfer instructions include a rootkit-target instruction selected from a group consisting of a system registry management instruction, a storage access instruction, a process or thread management instruction, and a network communications monitoring instruction.

3. The computer system of claim 1, wherein the isolated virtual environment maintains a shadow stack and a set of shadow registers isolated from a host stack and set of host registers used in the execution of the target program, and wherein the code generation engine is configured to generate stack and register isolation code for isolating the shadow stack and the shadow registers from the host stack and host registers.

4. The computer system of claim 1, wherein the code generation engine is configured to translate offensive instructions of the target of the original control transfer instruction to generate the target of the translated control transfer instruction.

5. The computer system of claim 4, wherein translating an offensive instruction comprises at least one operation selected from a group consisting of replacing the offensive instruction and preceding the offensive instruction by instrumentation code.

6. The computer system of claim 1, wherein the DBI engine comprises a basic block cache configured to store a set of translated basic blocks including the target of the translated control transfer instruction.

7. The computer system of claim 1, wherein the ARK engine is a kernel-mode ARK engine operating in kernel mode.

8. The computer system of claim 1, wherein the ARK engine is a user-mode ARK engine operating in user mode.

9. The computer system of claim 1, wherein the jump instruction is a conditional jump instruction.

10. A computer-implement method comprising employing a computer system comprising at least one processor and associated memory to:

dynamically identify a set of control transfer instructions in a target program being executed on the computer system;

in response to identifying an original instruction as a control transfer instruction, replace the original control transfer instruction with at least one translated instruction transferring execution control from the target program to an isolated virtual environment, for execution of a target of the translated control transfer instruction in the isolated virtual environment, wherein the original control transfer instruction does not transfer execution control from the target program, and wherein the original control transfer instruction is a jump instruction;

determine whether the target of the translated control transfer instruction resides in write-protected memory, and write-protect a memory space storing the target of the translated control transfer instruction in response to determining that the target of the translated control transfer instruction resides in memory that is not write-protected;

hook an exception-handling function, and in response, update a set of parameters of the exception-handling function; and identify a presence of a rootkit on the computer system according to a result of executing the target of the translated control transfer instruction in the isolated virtual environment.

11. The method of claim 10, wherein the set of control transfer instructions include a rootkit-target instruction selected from a group consisting of a system registry management instruction, a storage access instruction, a process or thread management instruction, and a network communications monitoring instruction.

12. The method of claim 10, wherein the isolated virtual environment maintains a shadow stack and a set of shadow registers isolated from a host stack and a set of host registers used in the execution of the target program, and wherein the method further comprises generating stack and register isolation code for isolating the shadow stack and the shadow registers from the host stack and host registers.

13. The method of claim 10, further comprising translating offensive instructions of the target of the original control transfer instruction to generate the target of the translated control transfer instruction.

14. The method of claim 13, wherein translating an offensive instruction comprises at least one operation selected from a group consisting of replacing the offensive instruction and preceding the offensive instruction by instrumentation code.

15. The method of claim 10, further comprising employing a basic block cache to store a set of translated basic blocks including the target of the translated control transfer instruction.

16. The method of claim 10, wherein dynamically identifying the set of control transfer instructions, replacing the original control transfer instruction, and executing the target of the translated control transfer instruction are performed by a kernel-mode anti-rootkit engine operating in kernel mode.

17. The method of claim 10, wherein dynamically identifying the set of control transfer instructions, replacing the original control transfer instruction, and executing the target of the translated control transfer instruction are performed by a user-mode anti-rootkit engine operating in user mode.

18. The method of claim 10, wherein the jump instruction is a conditional jump instruction.

19. A non-transitory computer-readable medium encoding instructions which, when executed by a computer system having at least one processor, cause the computer system to form:

a dynamic binary instrumentation (DBI) engine comprising
a code generation engine configured to
dynamically identify a set of control transfer instructions in a target program being executed on the computer system; and
in response to identifying an original instruction as a control transfer instruction, replace the original control transfer instruction with at least one translated instruction transferring execution control from the target program to an isolated virtual environment, for execution of a target of the translated control transfer instruction in the isolated virtual environment, wherein the original control transfer instruction does not transfer execution control from the target program, and wherein the original control transfer instruction is a jump instruction;
a self-modifying code manager configured to determine whether the target of the translated control transfer instruction resides in write-protected memory, and to write-protect a memory space storing the target of the translated control transfer instruction in response to determining that the target of the translated control transfer instruction resides in memory that is not write-protected;
an asynchronous task manager configured to hook an exception-handling function, and in response, update a set of parameters of the exception-handling function; and
a rootkit identification engine responsive to the DBI engine and configured to identify a presence of a rootkit according to a result of executing the target of the translated control transfer instruction in the isolated virtual environment.

20. The non-transitory computer-readable medium of claim 19, wherein the jump instruction is a conditional jump instruction.

* * * * *